United States Patent
Chu et al.

(10) Patent No.: US 9,232,469 B2
(45) Date of Patent: Jan. 5, 2016

(54) EARLY ENDING OF FRAME RECEPTION

(71) Applicant: STMicroelectronics, Inc., Coppell, TX (US)

(72) Inventors: Liwen Chu, San Ranmon, CA (US); George A. Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 215 days.

(21) Appl. No.: 14/025,456

(22) Filed: Sep. 12, 2013

(65) Prior Publication Data

US 2014/0078949 A1   Mar. 20, 2014

Related U.S. Application Data

(60) Provisional application No. 61/701,213, filed on Sep. 14, 2012.

(51) Int. Cl.
*G08C 17/00* (2006.01)
*H04W 52/02* (2009.01)

(52) U.S. Cl.
CPC ...... *H04W 52/0209* (2013.01); *H04W 52/0219* (2013.01)

(58) Field of Classification Search
CPC .............. H04W 52/0209; H04W 52/219
See application file for complete search history.

(56) References Cited

U.S. PATENT DOCUMENTS

| | | | | |
|---|---|---|---|---|
| 5,850,556 | A * | 12/1998 | Grivna ........................ | 710/260 |
| 7,281,187 | B2 * | 10/2007 | Yonge et al. ................. | 714/752 |
| 2008/0181157 | A1 * | 7/2008 | Aoki ............................ | 370/311 |
| 2009/0282148 | A1 * | 11/2009 | Wong et al. ................. | 709/226 |
| 2012/0294211 | A1 * | 11/2012 | Zhu ............................. | 370/310 |
| 2012/0314696 | A1 * | 12/2012 | Liu ............................. | 370/338 |
| 2013/0010595 | A1 * | 1/2013 | Park et al. ................... | 370/231 |
| 2014/0078949 | A1 * | 3/2014 | Chu et al. ................... | 370/311 |

OTHER PUBLICATIONS

IEEE Standards Association, "IEEE Standard for information technology—Telecommunications and information exchange between systems—Local and metropolitan area networks—Specific requirements—Part 11: Wireless LAN Medium Access Control (MAC) and Physical Layer (PHY) Specifications," IEEE Computer Society, IEEE Std 802.11™-2012, 2012, 2793 pages.

IEEE Standards Association, "IEEE Standard for information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHZ," IEEE Computer Society, IEEE Std 802.11ac™-2013, 2013, 425 pages.

Abraham et al., IEEE 802.11-12/0129r3, "Short Beacon" May 2012, 21 pages.

Jafarian et al., IEEE 802.11-12/861r0, "EDCA Parameters" Jul. 16, 2012, 10 pages.

Liu et al., IEEE 802.11-12/0838r0, "Full Beacon" Jul. 16, 2012, 7 pages.

* cited by examiner

*Primary Examiner* — Robert Wilson
(74) *Attorney, Agent, or Firm* — Seed IP Law Group PLLC (57) ABSTRACT

An additional cyclic redundancy check (CRC) is inserted in IEEE 802.11 beacon or data frames prior to the end of the frame, at a location following information sufficient for the receiving station to determine whether the frame is from an overlapping basic service set or intended for a different station and to extract other necessary or useful information such as a time of the next full beacon. Upon detecting the CRC, the receiving STA can terminate reception of the frame early to conserve power, and then enter a low power operational mode to further conserve power.

22 Claims, 5 Drawing Sheets

EARLY ENDING OF FRAME RECEPTION

The present application incorporates by reference the subject matter of U.S. Provisional Patent Application No. 61/701,213 entitled "EARLY ENDING OF FRAME RECEPTION" and filed on Sep. 14, 2012.

TECHNICAL FIELD

The present application relates generally to wireless communications and, more specifically, to reducing power consumption by wireless communication system stations.

BACKGROUND

A communications standard, Institute for Electrical and Electronic Engineers (IEEE) 802.11ah, is being developed for sensor networks and stations (STAs) in such sensor networks that require a power save mode of operation to, e.g., conserve battery power. IEEE 802.11ac uses partial bits of Association IDentifiers (AIDs) assigned to STAs in the physical layer (PHY) signal (SIG) to decrease power consumption of data frame reception. In a 1 mega-Hertz (MHz) Basic Service Set (BSS), however, there is no provision for transmission of only a partial AID in the PHY SIG. When an Access Point (AP) does not change the management information of the corresponding BSS, the associated STAs do not need to receive the whole beacon; instead, only time synchronization information and a Traffic Indication Map (TIM) information are required to the STA to operate with improved power conservation.

There is, therefore, a need in the art for improved power saving mechanisms in using wireless network connections.

SUMMARY

An additional cyclic redundancy check (CRC) is inserted in IEEE 802.11 beacon or data frames prior to the end of the frame, at a location following information sufficient for the receiving station to determine whether the frame is from an overlapping basic service set or intended for a different station and to extract other necessary or useful information such as a time of the next full beacon. Upon detecting the CRC, the receiving STA can terminate reception of the frame early to conserve power, and then enter a low power operational mode to further conserve power.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any hardware device that controls at least one operation, whether based upon firmware or user-supplied software executing within the controller. It should be noted that the functionality associated with any particular controller might be centralized or distributed, whether locally or remotely. Definitions for certain words and phrases are provided throughout, this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

In IEEE 802.11 communication systems, the TIM is the first element in the beacon frame. In both short and full format beacon frames in accordance with the present disclosure, a 1-octet cyclic redundancy check (CRC) is added after the TIM element (if the beacon frame includes the TIM element), so that a STA can stop frame reception after receiving the 1-octet CRC if the beacon is from another BSS (to which the STA does not belong) or if the AP does not change the management information of the BSS. In a data frame in accordance with the present disclosure, a 1-octet CRC is added after frame header and, if a STA is not the destination (an intended recipient) of the data frame, that STA can stop the frame reception after receiving 1-octet CRC. In a management frame other than a beacon frame in accordance with the present disclosure, a 1-octet CRC is added after frame header and, if a STA is not the destination of the frame, that STA can stop the frame reception after receiving 1-octet CRC.

Figures 1, 2A:
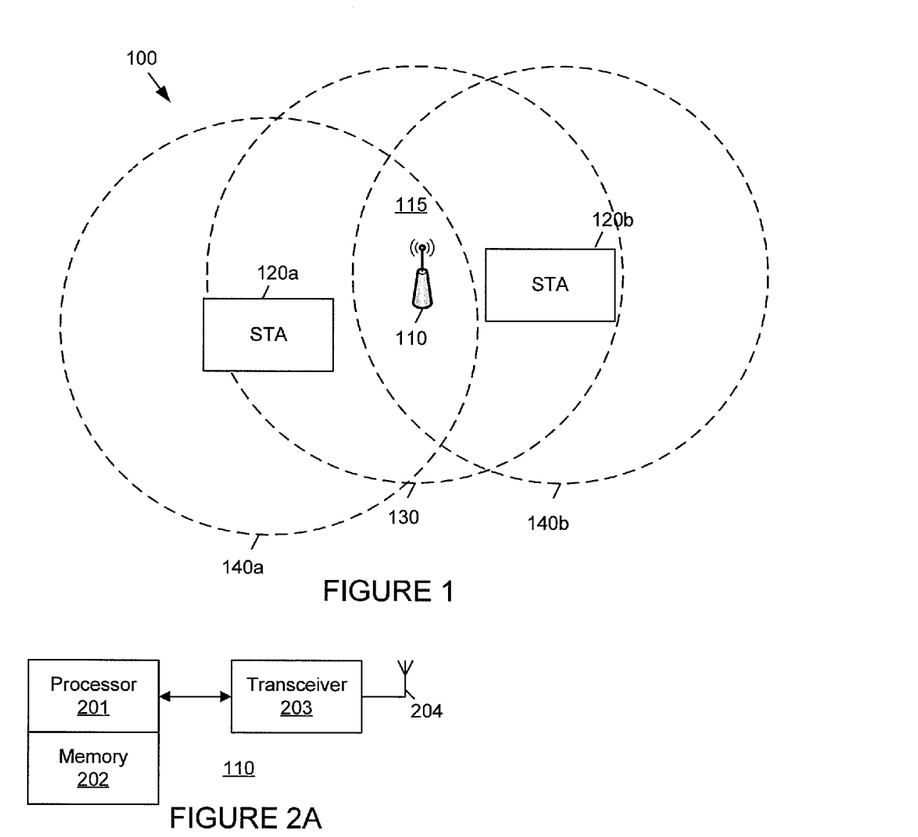
FIG. 1 illustrates a wireless local area network (WLAN) environment including enhanced low power medium access stations employing early ending of frame reception in accordance with various embodiments of the present disclosure.
FIGS. 2A and 2B are high level block diagrams of an access point and an enhanced low power medium access station, respectively, configured to employ early ending of frame reception in accordance with the present disclosure.

FIG. 1 illustrates a wireless local area network (WLAN) environment in which enhanced low power medium access stations in accordance with various embodiments of the present disclosure are implemented. WLAN environment 100 includes a basic service set (BSS) 115 of an IEEE 802.11 wireless local area network. The BSS 115 includes an access point (AP) 110 that is connected to an external network (not shown) and a plurality of stations (STAs, also called "nodes" or "clients") 120a and 120b located within coverage area 130 of AP 110. STAs 120a and 120b are visible to the AP 110 and can communicate with the AP 110. The reception area 140a is the coverage area of STA 120a, and reception area 140b is the coverage area of station 120b. In some instances, another BSS (not shown) may be situated at a location from which the signal from that other BSS overlaps the coverage area 130 of BSS 115 (that is, the other BSS lies within the reception area 140a, 140b of STAs 120a, 120b, respectively).

Figure 2B:
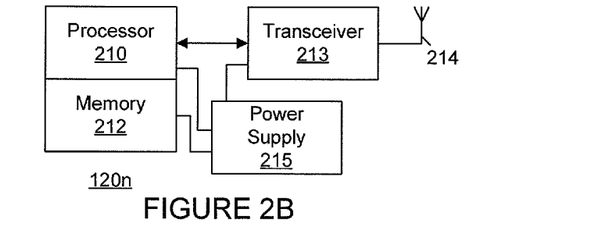

FIGS. 2A and 2B are high level block diagrams of an access point and an enhanced low power medium access station, respectively, configured to employ early ending of frame reception in accordance with the present disclosure. As illustrated in FIG. 2A, the access point 110 includes a processor (or programmable microcontroller) 201 either incorporating or communicably coupled to a memory 202. The processor 201 is also communicably coupled to a transceiver (combined transmitter and receiver, which may be replaced by a transmitter separate from a receiver) 203, which provides for transmission and/or reception of wireless signals over antenna 204. The processor 201 executes a control program within memory 202 to broadcast 802.11 wireless management frames enabling enhanced low power medium access station to employ early ending of frame reception, as discussed in further detail below. The memory 202 (which may include multiple different memory devices and/or forms of memory) can also buffer data received for delivery to one of the STAs 120a or 120b.

As illustrated in FIG. 2B, the station 120n (which may be either station 120a or 120b in FIG. 1, or a station not depicted in FIG. 1) includes a generally similar architecture to access point 110. A processor (or programmable microcontroller) 210 and memory 212 are configured to communicate, and the processor 210 is configured to transmit or receive wireless signals via transceiver 213 and antenna 214. Importantly, the power supply 215 in station 120n may be a battery (non-rechargeable or rechargeable form, for example, solar power) or other limited power source.

Those skilled in the art will recognize that the full structure and operation of a wireless network, including the access point and stations, are not depicted in the drawings or described herein. Instead, for simplicity and clarity, only so much of the structure of a wireless network (and the access point(s) and stations therein) as is unique to the present disclosure or necessary for an understanding of the present disclosure is depicted and described.

Figure 3A:
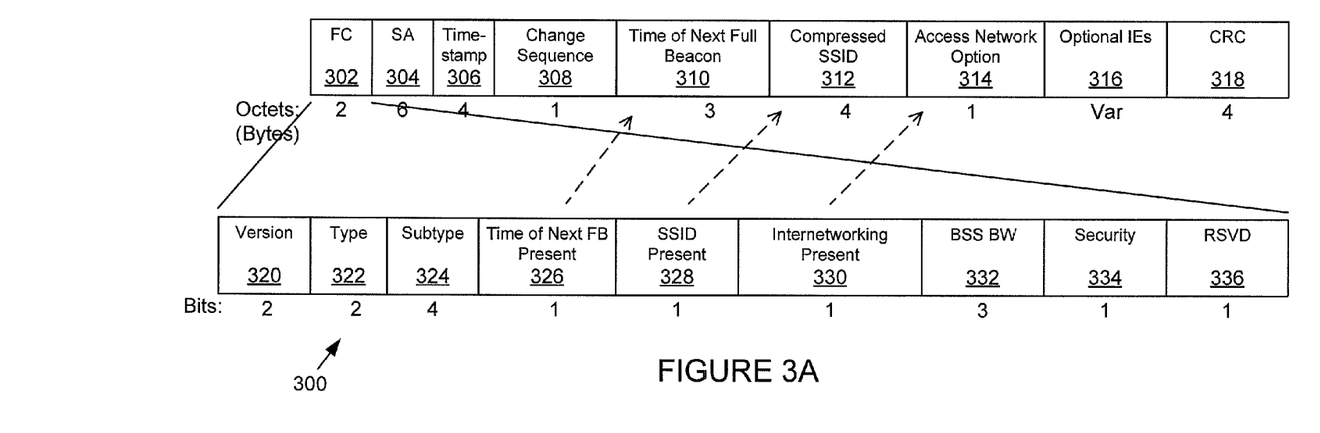
FIGS. 3A, 3B and 3C are diagrams of beacon frames transmitted within a wireless local area network environment, including beacon frames transmitted within a wireless local area network including enhanced low power medium access stations employing early ending of frame reception in accordance with various embodiments of the present disclosure.
Figure 3B:
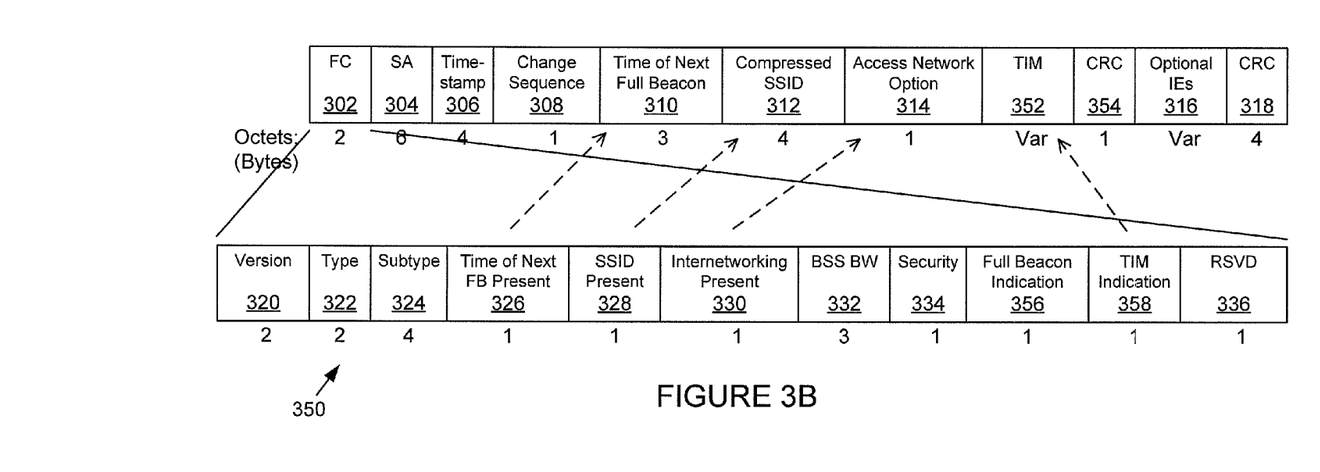
Figure 3C:
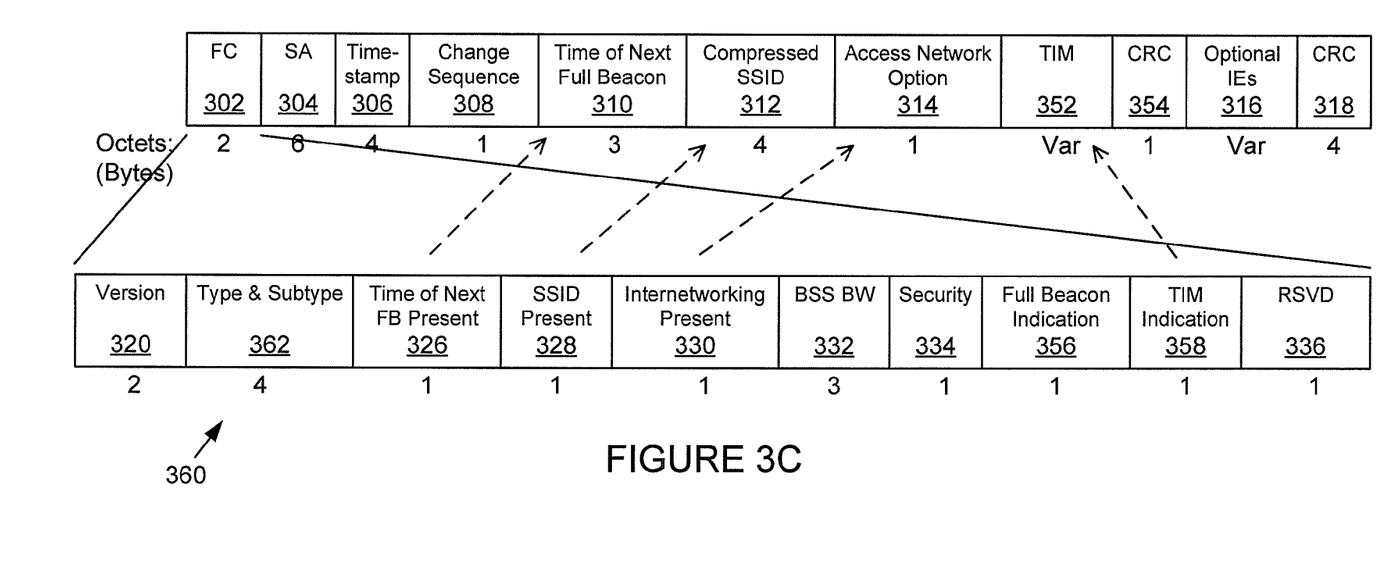

FIGS. 3A, 3B and 3C are diagrams of beacon frames transmitted within a wireless local area network environment, including beacon frames transmitted within a wireless local area network including enhanced low power medium access stations employing early ending of frame reception in accordance with various embodiments of the present disclosure. As depicted in FIG. 3A, a beacon format 300 can include: a two octet (byte) Frame Control (FC) field 302; a six octet Source Address (SA) field 304; a four octet Timestamp field 306; a one octet Change Sequence field 308; a three octet Time of Next Full Beacon field 310; a four octet Compressed Service Set Identifier (SSID) field 312; a one octet Access Network Option field 314; a variable length field of additional information elements (IEs) 316; and a four octet frame CRC field 318. The FC field 302 may include: two bits 320 indicating the version; two bits 322 indicating the type; four bits 324 indicating the subtype; one bit 326 indicating whether a Time of Next Full Beacon field is present; one bit 328 indicating whether an SSID is present; one bit 330 indicating whether internetworking information is present; a three bit indicator 332 of BSS bandwidth (BW); a single bit security indicator 334; and a single reserved (RSVD) bit 336.

Proposals for an IEEE 802.11ah short beacon format (11-12-0129-03-00ah-short-beacon), IEEE 802.11ah Enhanced Distributed Channel Access (EDCA) parameters (11-12-0861-00-00ah-edca-parameters-for-11ah) and an IEEE 802.11ah full beacon format (11-12-0838-00-00ah-full-beacon), all of which are incorporated herein by reference, include suggestions that full beacons use the same format as a short beacon, but should also include a full set of fields/Information Elements (IEs) needed to advertise all of the BSS information. The manner of indicating a full beacon (as opposed to a short beacon) remains to be determined. One possible solution is to set the value of the Time of Next Full Beacon equal to the higher 3 bytes of the Timestamp field. The principle functions of a beacon are: advertising AP presence; synchronizing the STAs with the AP clock; indicating power save capabilities (e.g., within the TIM); and, for the full beacon, advertising all the information of the BSS.

When a STA is already associated with the AP or BSS and the AP does not change any BSS management information, the STA does not need to receive all of the information within the entire beacon. In addition, when a STA receives a full beacon from an overlapping BSS (OBSS), the STA doesn't need to receive all of the information in the entire beacon (just enough to determine that the beacon relates to another BSS). The STAs can save the power of receiving the entire beacon with early ending of beacon reception.

FIG. 2B illustrates improvement of the full beacon in accordance with the present disclosure by addition of another CRC 354. One combination of Type/Subtype field values indicates that the frame is a full beacon with compressed Media Access Control (MAC) header. A single bit "Full Beacon Indication" 356 is added to FC to differentiate a full beacon from a short beacon: when the "Full Beacon Indication" value is 1, the beacon is a full beacon; when the Full Beacon Indication value is 0, the beacon is not a full beacon (i.e., is a short beacon). The "Time of Next Full Beacon" field value indicates the time to the next full beacon.

In accordance with the present disclosure, one additional 1-octet CRC 354 is added to the beacon frame, immediately following the (variable length) TIM 352. Only the TIM IE 352 is ahead of the first 1-octet CRC 354, if the beacon includes a TIM IE. There are no IEs before the first 1-octet CRC if the beacon does not include a TIM IE. A "TIM Indication" flag 358 is added to FC field: when the "TIM Indication" value is 1, the TIM IE 352 is the only information element that is ahead of the first CRC 354; when the "TIM Indication" value is 0, there are no IEs that are ahead of the first CRC 354 and there is no TIM in the full beacon.

A STA will cease the reception of a detected full beacon after receiving the first CRC 354 if the STA is not associated with the AP or BSS identified by SA 304. A STA will also cease the reception of a detected full beacon after the first CRC 354 if the STA is associated with the AP or BSS identified by SA 304, but is not the desired recipient of that beacon because the STA already has the updated BSS information defined in various IEs in the beacon through checking Change Sequence 308. The TIM 352 has the newest buffered frame information in the AP.

FIG. 3C illustrates improvement of the short beacon in accordance with the present disclosure by addition of another CRC 354. Short beacons 360 may also be improved by adding another 1-octet CRC as described above in connection with a full beacon.

Figure 4A:
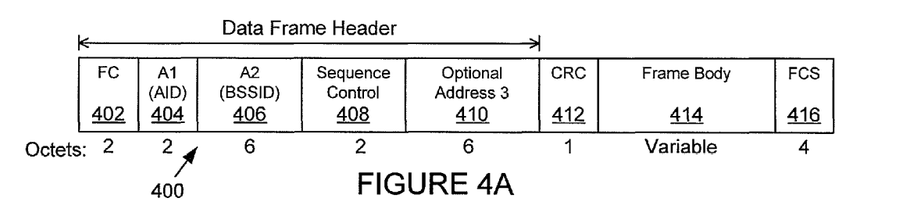
FIGS. 4A and 4B are diagrams of data frames transmitted within a wireless local area network environment including enhanced low power medium access stations employing early ending of frame reception in accordance with various embodiments of the present disclosure.
Figure 4B:
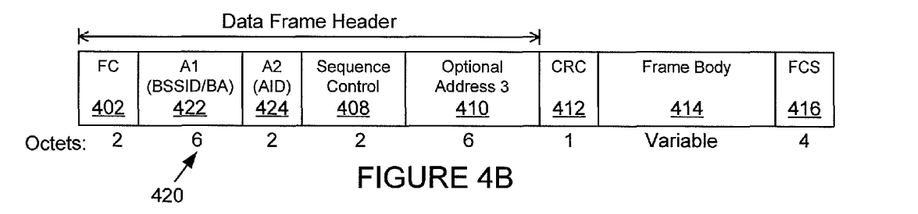

FIGS. 4A and 4B are diagrams of data frames transmitted within a wireless local area network environment including enhanced low power medium access stations employing early ending of frame reception in accordance with various embodiments of the present disclosure. Data frames 400 and 420 each include a data frame header. The data frame header includes a two octet FC field 402, a two octet A1 field 404 containing the destination Association Identifier (AID), a six octet A2 field 406 containing the BSS Identifier (BSSID), a two octet sequence control field 408, a six octet optional third address field 410 in the data frame 400 of FIG. 4A. The data frame header includes a two octet FC field 402, a six octet A1 field 422 containing the BSSID, a two octet A2 field 424 containing the destination AID, a two octet sequence control field 408, a six octet optional third address field 410 in the data frame 420 of FIG. 4B. In both data frames 400, 420, the data frame header is followed in the present disclosure by a one octet CRC field 412, after which is the (variable length) frame body 414 and a four octet Frame Check Sequence 416.

In the present disclosure, data frames transmitted at greater than 2 mega-Hertz (MHz) may be discarded early. The Partial Association IDentifier (PAID) field is present in the PHY SIG field of frames whose transmitted bandwidth is 2 MHz or greater. If a STA receives a frame with a PAID that does not match the receiving STA's PAID, the STA can discard the frame after receiving the PHY SIG. (It is possible that two STAs may have same PAID value but different AID values. Such STAs still need to receive whole data frames before deciding whether the frame is for it or not.) However, the PAID field is absent from Physical Layer Convergence Protocol (PLCP) Protocol Data Units (PPDUs) whose transmitted bandwidth is 1 MHz. Therefore, the early discarding feature cannot be used with such frames. Assuming frames of the same length, 1 MHz transmissions will use the medium longer than transmission at or greater than 2 MHz.

Nonetheless, 1 MHz Data/Management frames may be improved by an additional CRC. A one octet CRC 412 is added after the data frame header. A bit in the Frame Control field may be used to indicate if the additional CRC for frame header exists. A STA will cease the reception of the detected data frame after receiving the first CRC if the value in A1 is not the AID of the receiving STA, or if the value in A1 is not the MAC address of the receiving STA.

Figure 5:
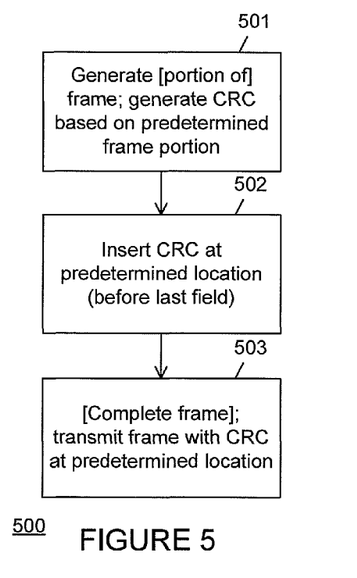
FIGS. 5 and 6 depict high level flow charts for processes performed within a wireless local area network environment including enhanced low power medium access stations employing early ending of frame reception in accordance with various embodiments of the present disclosure.
Figure 6:
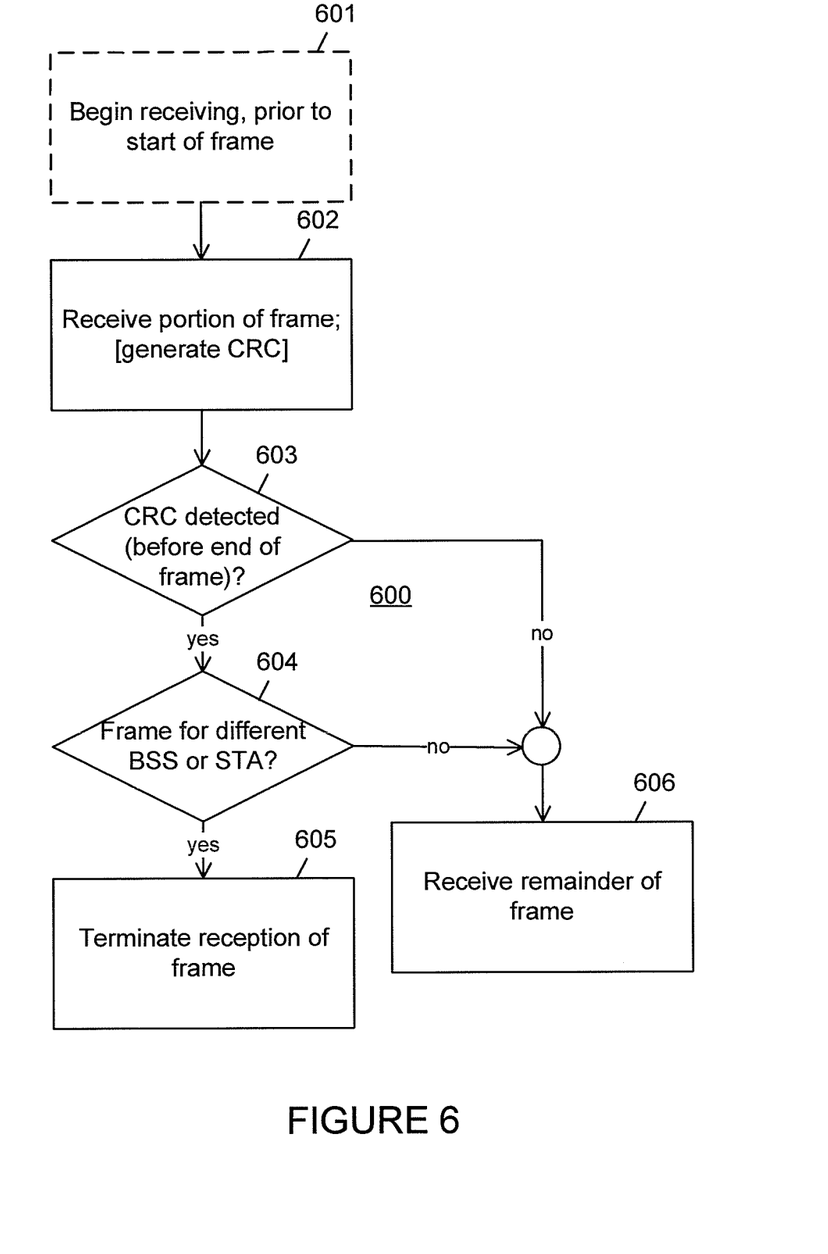

FIGS. 5 and 6 depict high level flow charts for processes performed within a wireless local area network environment including enhanced low power medium access stations employing early ending of frame reception in accordance with various embodiments of the present disclosure. FIG. 5 illustrates a process 500 implemented within an access point 110 or a STA 120a/120b. The process begins by controller within the access point (e.g., processor 201) or the STA (e.g., processor 210) generating the content for at least a portion of a frame to be transmitted (step 501). In the example described above, the portion includes fields 302, 304, 306, 308, 310, 312, 314 and (if included) TIM 352 for a beacon frame 350 or 360, and the data frame header (e.g., fields 402, 404 or 422, 406, 408 and 410) for a data frame 400 or 420. In alternative embodiments, however, other fields might be included. For example, in a future expansion of IEEE 802.11, one of the optional IEs 316 might be used to control (e.g., activate or deactivate) functionality in a manner consistent with "legacy" stations not including such functionality. In such an instance, the predetermined location might be moved to encompass the first optional IE within a beacon frame, to ensure that STAs receive that optional IE before early termination of frame reception.

Once the portion of the frame on which the CRC is to be based has been generated, the CRC is generated based on the content in that portion of the frame. While at least the portion of the frame on which the CRC is based is generated in step 501, other portions of the frame or even the entire frame may be concurrently generated. In addition, generation of the CRC may proceed concurrently with generation of the content for the frame portion used to generate the CRC.

Once the CRC has been generated, the CRC is inserted into the frame at a predetermined location (step 502) before the last field of the frame. In the examples described above, for beacon frames the CRC is inserted immediately following the TIM, if present, or in the location where the TIM would have been inserted had a TIM been included. For data frames, the CRC is inserted immediately following the data frame header. As noted above, in some embodiments it may be desirable to alter the predetermined location within the frame for the CRC from that given in the examples described above. If not already complete, the frame is then completed and transmitted with the CRC at the predetermined location (step 503).

FIG. 6 illustrates a process 600 implemented within any AP 110 or station 120a, 120b. The process begins by controller within the AP (e.g., processor 201) or the station (e.g., processor 210) optionally beginning to receive signals (step 601). For example, the station may have been in a doze state to conserve power, and may wake up shortly before the start time of an anticipated full beacon frame broadcast, as described above. The access point or the station receives a portion of the frame (step 602), and may optionally concurrently generate a CRC concurrently with receiving the start of the frame, for use in later validating received content. A determination is made regarding whether a CRC has been detected in the received frame portion at a predetermined location prior to the end of the frame and matched with the calculated CRC (step 603). For example, a CRC may be located within the frame content immediately following the TIM or the end of the data frame header, as described above. If a CRC has, in fact, been detected at such a location prior to the end of the frame and matched with the calculated CRC, a determination is made as to whether the frame is either for a different BSS from that with which the receiving STA is associated or for a different STA within the same BSS as that with which the receiving STA is associated (step 604). For example, the SA 304 or the BSSID 406 might be used to determine whether the frame originates from the BSS with which the receiving STA is associated.

If the frame is from a different BSS or intended for a different STA, reception of the frame is terminated early (step 605), preferably as soon as practicable after detection of the CRC and verification that the frame is not for the receiving STA, to conserve power. However, if the frame is not from a different BSS or intended for a different STA, or if no CRC is detected at a location prior to the end of the frame, the remainder of the frame is received (step 606).

While each process flow and/or signal or event sequence depicted in the figures and described herein involves a sequence of steps, signals and/or events, occurring either in series or in tandem, unless explicitly stated or otherwise self-evident (e.g., a signal cannot be received before being transmitted), no inference should be drawn regarding specific order of performance of steps or occurrence of signals or events, performance of steps or portions thereof or occurrence of signals or events serially rather than concurrently or in an overlapping manner, or performance the steps or occurrence of the signals or events depicted exclusively without the occurrence of intervening or intermediate steps, signals or events. Moreover, those skilled in the art will recognize that complete processes and signal or event sequences are not illustrated or described. Instead, for simplicity and clarity, only so much of the respective processes and signal or event sequences as is unique to the present disclosure or necessary for an understanding of the present disclosure is depicted and described.

While this disclosure has described certain embodiments and generally associated methods, alterations and permutations of these embodiments and methods will be apparent to those skilled in the art. Accordingly, the descriptions of example embodiments do not define or constrain this disclosure. Other changes, substitutions, and alterations are also possible without departing from the spirit and scope of this disclosure, as defined by the following claims.

What is claimed is:

1. A wireless device, comprising:
    a controller operable in a wireless local area network (WLAN) configured to:
        generate content for fields up to a predetermined location from a start of frame field within a frame that conforms to a WLAN protocol, the WLAN protocol defining a beacon frame, wherein the predetermined location is before a last field of the frame, wherein the fields up to the predetermined location from the start of the frame include for the beacon frame, fields up to and including one of a Traffic Indication Map (TIM) field, if a TIM is to be included in the beacon frame, and a field immediately preceding a location at which the TIM field would be inserted, if no TIM is to be included in the beacon frame, and for a data frame, a last field within a data frame header for the data frame;
        generate a cyclic redundancy check (CRC) value on the content generated for the fields, and
        insert the generated CRC value into the frame at the predetermined location; and
    a transmitter configured to transmit the frame.

2. The wireless device according to claim 1, wherein the controller is configured to generate content for additional fields within the frame concurrently with generating content for the fields.

3. The wireless device according to claim 1, wherein the controller is configured to generate content for the entire beacon frame.

4. The wireless device according to claim 1, wherein, for a beacon frame, the controller is configured to insert a bit in the beacon frame indicating whether the TIM is included in the beacon frame.

5. The wireless device according to claim 1, wherein the CRC value is one octet in the beacon frame.

6. The wireless device according to claim 1, wherein the frame that conforms to the WLAN protocol conforms to an IEEE 802.11 protocol.

7. A wireless device, comprising:
    a receiver operable in a wireless local area network (WLAN) configured receive a portion of a frame from an access point, wherein the frame conforms to a WLAN protocol; and
    a controller configured to
        determine whether the received frame portion includes a cyclic redundancy check (CRC) value at a predetermined location from a start of the frame, wherein the predetermined location is before a last field of the frame, and
        responsive to determining that the received frame portion includes a CRC value, cause the receiver to terminate reception of a remaining portion of the frame if the frame is either for a basic service set with which the station is not associated or for another station.

8. The wireless device according to claim 7, wherein, for a beacon frame, the predetermined location comprises at least one of immediately following a Traffic Indication Map (TIM) field, if the beacon frame includes a TIM, and immediately preceding optional information elements within the beacon frame.

9. The wireless device according to claim 7, wherein, for a data frame, the predetermined location comprises a field immediately following the data frame header.

10. The wireless device according to claim 7, wherein the CRC value comprises a CRC generated on content preceding the CRC within the frame.

11. The wireless device according to claim 7, wherein the controller is configured, responsive to determining that the received frame portion does not include any CRC value, to cause the receiver to receive all of the frame.

12. The wireless device according to claim 7, wherein the receiver is configured to store content from the frame as the content is received for processing by the controller to detect a CRC value.

13. The wireless device according to claim 7, wherein the controller is configured, after causing the receiver to terminate reception of the remaining portion of the frame, to cause the station to enter a low power operational mode.

14. The wireless device according to claim 7, wherein the frame from the access point conforms to an IEEE 802.11 protocol.

15. A method, comprising:
    receiving, in a receiver within a wireless device operating in a wireless local area network (WLAN), a portion of a frame from an access point, wherein the frame conforms to a WLAN protocol; and
    determining with a controller within the wireless device whether the received frame portion includes a cyclic redundancy check (CRC) value at a predetermined location from a start of the frame, wherein the predetermined location is before a last field of the frame; and
    responsive to determining that the received frame portion includes a CRC value, causing the receiver to terminate reception of a remaining portion of the frame if the frame is for a basic service set with which the wireless device is not associated or for another wireless device.

16. The method according to claim 15, wherein, for a beacon frame, the predetermined location comprises at least one of immediately following a Traffic Indication Map (TIM) field, if the beacon frame includes a TIM, and immediately preceding optional information elements within the beacon frame.

17. The method according to claim 15, wherein, for a data frame, the predetermined location comprises a field immediately following the data frame header.

18. The method according to claim 15, wherein the CRC value comprises a CRC generated on content preceding the CRC within the frame.

19. The method according to claim 15, further comprising:
    responsive to determining that the received frame portion does not include any CRC value, causing the receiver to receive all of the frame.

20. The method according to claim 15, further comprising:
    storing content from the frame within memory within the wireless device as the content is received for processing by the controller to detect a CRC value.

21. The method according to claim 15, further comprising:
after causing the receiver to terminate reception of the remaining portion of the frame, causing the wireless device to enter a low power operational mode.

22. The method according to claim 15, wherein the portion of the frame received from the access point conforms to an IEEE 802.11 protocol.

* * * * *